United States Patent
Farrell et al.

(10) Patent No.: US 12,401,499 B2
(45) Date of Patent: Aug. 26, 2025

(54) SYMMETRIC KEY ATTESTATION OF REMOVABLE CIRCUITS

(71) Applicant: GM GLOBAL TECHNOLOGY OPERATIONS LLC, Detroit, MI (US)

(72) Inventors: Brian Farrell, Troy, MI (US); Christopher J. Kloote, Livonia, MI (US); Manohar Reddy Nanjundappa, Cedar Park, TX (US); Kenneth W. Junk, Marshalltown, IA (US)

(73) Assignee: GM Global Technology Operations LLC, Detroit, MI (US)

( * ) Notice: Subject to any disclaimer, the term of this patent is extended or adjusted under 35 U.S.C. 154(b) by 284 days.

(21) Appl. No.: 18/194,029

(22) Filed: Mar. 31, 2023

(65) Prior Publication Data
US 2024/0333479 A1    Oct. 3, 2024

(51) Int. Cl.
*H04L 9/08* (2006.01)
*H04L 9/32* (2006.01)
*H04L 12/40* (2006.01)

(52) U.S. Cl.
CPC .......... *H04L 9/0825* (2013.01); *H04L 9/0891* (2013.01); *H04L 9/3242* (2013.01);
(Continued)

(58) Field of Classification Search
CPC ... H04L 9/0825; H04L 9/0891; H04L 9/3242; H04L 12/40013; H04L 2012/40273;
(Continued)

(56) References Cited

U.S. PATENT DOCUMENTS

| | | | | |
|---|---|---|---|---|
| 2006/0253711 A1* | 11/2006 | Kallmann | ............. | B60R 25/252 713/186 |
| 2009/0005916 A1* | 1/2009 | Wainwright | ............ | H04L 67/12 701/1 |

(Continued)

FOREIGN PATENT DOCUMENTS

| | | | | |
|---|---|---|---|---|
| CN | 114866987 A | * | 8/2022 | |
| EP | 4250631 A1 | * | 9/2023 | ........... G07C 5/0808 |

(Continued)

OTHER PUBLICATIONS

Giampaolo Bella, "Cinnamon: A Module for Autosar Secure Onboard Communication" Published in: 2020 16th European Dependable Computing Conference (EDCC), Date of Conference: Sep. 7-10, 2020, 8 pages (Year: 2020).*

(Continued)

*Primary Examiner* — Shahriar Zarrineh
(74) *Attorney, Agent, or Firm* — Quinn IP Law

(57) ABSTRACT

An apparatus includes a compute device having a microcontroller unit circuit, multiple processing circuits, and a backplane bus. Initial unsecured communications through the backplane bus are restricted. The microcontroller unit circuit is operational to authenticate the processing circuits with a plurality of processor attestations over a local area network bus based on a secure onboard communication protocol of an automotive open system architecture, a symmetric key, and a message authentication code. The processing circuits are operational to reply to the processor attestations over the local area network bus, and verify the microcontroller unit circuit based on the secure onboard communication protocol, the symmetric key, and the message authentication code received from the microcontroller unit circuit. Secure communications through the backplane bus among the processing circuits is enabled based on the authentications of the processing circuits and the verifications of the microcontroller unit circuit.

20 Claims, 9 Drawing Sheets

(52) U.S. Cl.
CPC ............... *H04L 12/40013* (2013.01); *H04L 2012/40273* (2013.01)

(58) Field of Classification Search
CPC ... H04L 2209/84; H04L 9/3271; H04L 63/08; H04L 12/2801; H04L 12/40006; H04L 2209/12
See application file for complete search history.

(56) References Cited

U.S. PATENT DOCUMENTS

| | | | |
|---|---|---|---|
| 2011/0200193 A1* | 8/2011 | Blitz | H04W 12/126 707/769 |
| 2021/0219114 A1* | 7/2021 | Otaka | H04W 4/48 |
| 2022/0116221 A1* | 4/2022 | Mondello | H04L 63/0442 |
| 2022/0131842 A1* | 4/2022 | Zhang | G06F 21/57 |
| 2023/0318823 A1* | 10/2023 | Geng | H04L 63/068 701/32.6 |
| 2023/0396447 A1* | 12/2023 | Junk | H04L 9/3247 |

FOREIGN PATENT DOCUMENTS

| | | | | |
|---|---|---|---|---|
| GB | 2592672 A | * | 9/2021 | ............. G06F 13/40 |
| WO | WO-2014101823 A1 | * | 7/2014 | ............. H04L 63/08 |
| WO | WO-2022246760 A1 | * | 12/2022 | |
| WO | WO-2023009987 A1 | * | 2/2023 | ........... G05D 1/0022 |

OTHER PUBLICATIONS

Marcel Rumez. An Overview of Automotive Service-Oriented Architectures and Implications for Security Countermeasures, Published in: IEEE Access ( vol. 8), Date of Publication: Dec. 7, 2020, pp. 221852-221870( 19 pages) (Year: 2020).*

* cited by examiner

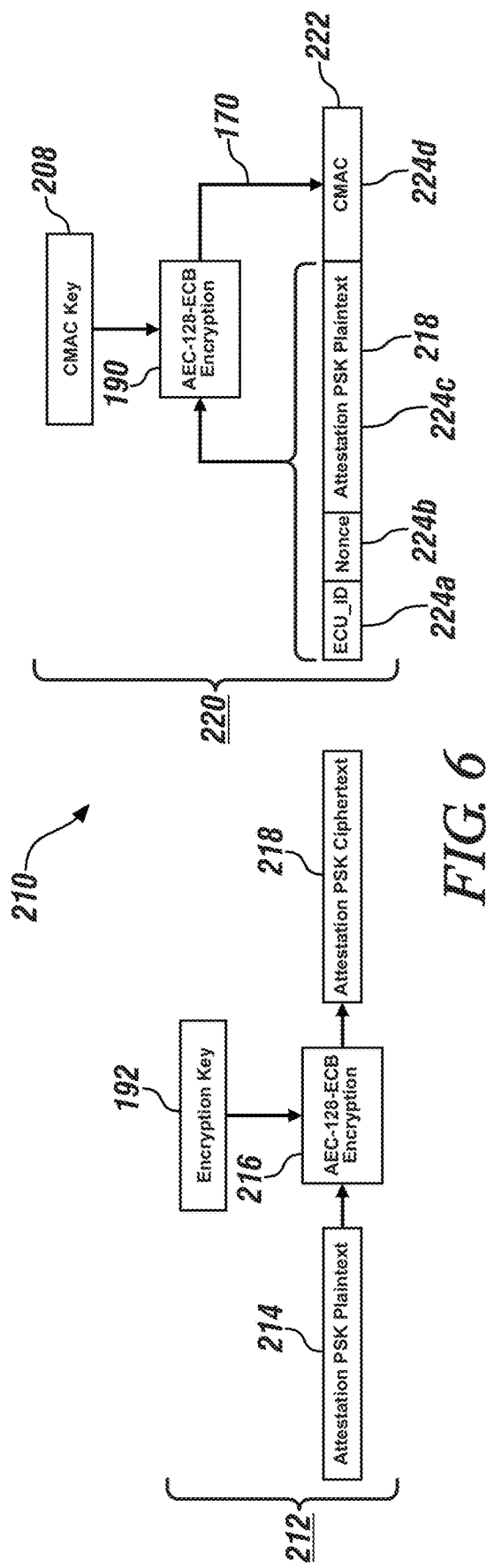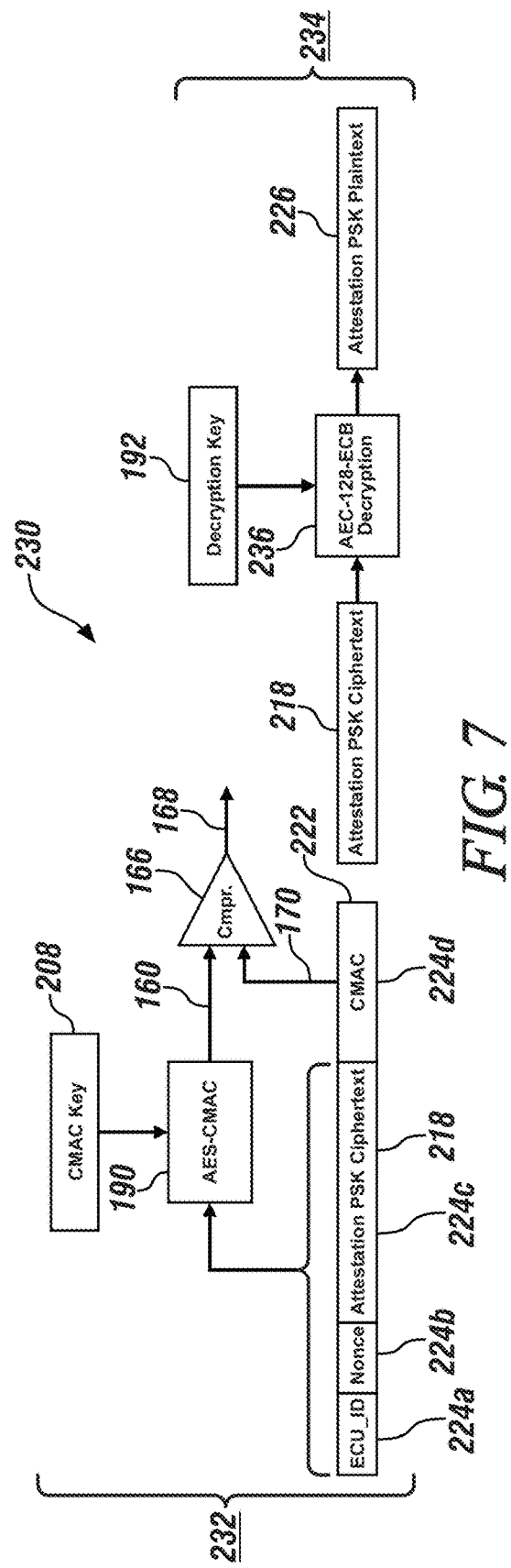

SYMMETRIC KEY ATTESTATION OF REMOVABLE CIRCUITS

The present disclosure relates to a system and a method for symmetric key attestation of removable circuits.

Inside electronic units, data is sent from one cartridge to another cartridge over a backplane bus. Interfaces between the cartridges and the backplane are easily accessible since the cartridges are expected to be replaceable by end customers. Peripheral Component Interconnect Express (PCIe) is a backplane bus often used to connect the cartridges. PCIe has limited protections for detecting, blocking, or auditing unauthorized cartridges. The limited protections are problematic for field replaceable components since the unauthorized cartridges expose PCIe links, and so provide access to the communications on the PCIe backplane.

Accordingly, those skilled in the art continue with research and development efforts in the field of symmetric key attestation of removable circuits.

SUMMARY

An apparatus is provided herein. The apparatus includes first compute device having a microcontroller unit circuit, multiple processing circuits, and a backplane bus. The first compute device is couplable to a local area network bus. The first compute device includes a first microcontroller unit circuit, a plurality of first processing circuits, and a first backplane bus. Initial unsecured communications through the first backplane bus is restricted. The first microcontroller unit circuit is permanently connected to the first compute device, and is operational to authenticate the plurality of first processing circuits with a plurality of first processor attestations over the local area network bus based on a secure onboard communication protocol of an automotive open system architecture, a symmetric key, and a first message authentication code. The plurality of first processing circuits is removably coupled to the first compute device, and is operational to: reply to a respective one of the plurality of first processor attestations over the local area network bus; and verify the first microcontroller unit circuit based on the secure onboard communication protocol, the symmetric key, and the first message authentication code received from the first microcontroller unit circuit. Secure communications through the first backplane bus among the plurality of first processing circuits is enabled based on the authentications of the plurality of first processing circuits and the verifications of the first microcontroller unit circuit.

In one or more embodiments of the apparatus, the first compute device is couplable to a physical communication link, and further includes a first switch circuit and a first serial management bus. The first microcontroller unit circuit is further operational to: communicate with the first switch circuit over the first serial management bus; and generate a first allow list based on the authentications of the plurality of first processing circuits. The first switch circuit is permanently coupled to the first compute device, and is operational to: translate data between the first backplane bus and the physical communication link; and enable the secure communications to the first backplane bus based on the first allow list.

In one or more embodiments of the apparatus, the first compute device further includes a first memory circuit and a first management bus. The first microcontroller unit circuit is further operational to: authenticate the first memory circuit with a first memory attestation over the first memory management bus based on the secure onboard communication protocol, the symmetric key, and the first message authentication code; and generate a first allow list based on the authentication of the first memory circuit and the authentications of the plurality of first processing circuits. The first memory circuit is removably coupled to the first compute device, and is operational to: reply to the first memory attestation over the first memory management bus; and enable the secure communications through the first backplane bus between the plurality of first processing circuits and the first memory circuit based on the first allow list.

In one or more embodiments of the apparatus, the first compute device further includes a first unauthenticated circuit. The first microcontroller unit circuit is further operational to: attempt authentication of the first unauthenticated circuit based on the secure onboard communication protocol, the symmetric key, and the first message authentication code; and generate a first deny list to isolate the first unauthenticated circuit in response to a failure to authenticate the first unauthenticated circuit. The plurality of first processing circuits is further operational to: block communications on the first backplane bus to the first unauthenticated circuit based on the first deny list.

In one or more embodiments of the apparatus, the symmetric key is updated with a secure hardware extension key update protocol.

In one or more embodiments of the apparatus, the first compute device further includes a noncompliant circuit that is not compliant with the secure onboard communication protocol. An electronic control unit identification value and an unlock-electronic-control-unit-key are programmed into the noncompliant circuit for use during an authentication.

In one or more embodiments of the apparatus, the first microcontroller unit circuit is further operational to: allocate additional key slots to remember one or more previously installed circuits in the first compute device; and clear one or more keys for the one or more previously installed circuits based on a time lapse since last installed in the first compute device.

In one or more embodiments of the apparatus, the local area network bus is one or more of an Ethernet bus, an inter-integrated circuit bus, a serial peripheral interface bus, and a universal asynchronous receiver-transmitter bus. The first backplane bus is a peripheral component interconnect express bus. The first microcontroller unit circuit is further operational to authenticate the plurality of first processing circuits based on one or more of (i) a power on condition, (ii) a detection that one or more of the plurality of first processing circuits is newly installed in the first compute device, and (iii) periodically.

In one or more embodiments, the apparatus further includes a second compute device coupled to the local area network bus. The second compute device includes a second microcontroller unit circuit, a plurality of second processing circuits, and a second backplane bus. Initial unsecured communications through the second backplane bus is restricted. The second microcontroller unit circuit is permanently connected to the second compute device, and is operational to: authenticate the plurality of second processing circuits with a plurality of second processor attestations over the local area network bus based on the secure onboard communication protocol, the symmetric key, and a second message authentication code; and generate a second allow list based on the authentications of the plurality of second processing circuits. The plurality of second processing circuits is removably coupled to the second microcontroller unit circuit, and is operational to: reply to a respective one of the plurality of second processor attestations over the local area network bus; and verify the second microcontroller unit circuit based on the secure onboard communication protocol, the symmetric key, and the second message authentication code received from the second microcontroller unit circuit. Secure communications through the second backplane bus among the plurality of second processing circuits is enabled based on the authentications of the plurality of second processing circuits and the verifications of the second microcontroller unit circuit.

A method for symmetric key attestation of removable circuits is provided herein. The method includes restricting initial unsecured communications through a first backplane bus of a first compute device. The first compute device is couplable to a local area network bus, and includes a first microcontroller unit circuit, a plurality of first processing circuits, and the first backplane bus. The first microcontroller unit circuit is permanently connected to the first compute device. The plurality of first processing circuits are removably coupled to the first compute device. The method includes authenticating, with the first microcontroller unit circuit, the plurality of first processing circuits with a plurality of first processor attestations over the local area network bus based on a secure onboard communication protocol of an automotive open system architecture, a symmetric key, and a first message authentication code; replying, with the plurality of first processing circuits, to a respective ones of the plurality of first processor attestations over the local area network bus; verifying, with the plurality of first processing circuits, the first microcontroller unit circuit based on the secure onboard communication protocol, the symmetric key, and the first message authentication code received from the first microcontroller unit circuit; and enabling secure communications on the first backplane bus among the plurality of first processing circuits based on the authenticating of the plurality of first processing circuits and the verifying of the first microcontroller unit circuit.

In one or more embodiments, the method includes communicating with a first switch circuit of the first compute device using the first microcontroller unit circuit; generating a first allow list based on the authenticating of the plurality of first processing circuits; translating data between the first backplane bus and a physical communication link, where the first compute device is couplable to the physical communication link; and enabling the secure communications between the first switch circuit and the first backplane bus based on the first allow list.

In one or more embodiments, the method includes authenticating, with the first microcontroller unit circuit, a first memory circuit of the first compute device with a first memory attestation over a first memory management bus of the first compute device based on the secure onboard communication protocol, the symmetric key, and the first message authentication code. The first memory circuit is removably coupled to the first compute device. The method further includes replying, with the first memory circuit, to the first memory attestation over the first memory management bus; generating a first allow list based on the authentication of the first memory circuit and the authentications of the plurality of first processing circuits; and enabling communication on the first backplane bus between the plurality of first processing circuits and the first memory circuit based on the first allow list.

In one or more embodiments, the method includes attempting, with the first microcontroller unit circuit, to authenticate a first unauthenticated circuit of the first compute device based on the secure onboard communication protocol, the symmetric key, and the first message authentication code; generating, with the first microcontroller unit circuit, a first deny list to isolate the first unauthenticated circuit in response to a failure to authenticate the first unauthenticated circuit; and blocking, with the plurality of first processing circuits, communications on the first backplane bus to the first unauthenticated circuit based on the first deny list.

In one or more embodiments, the method includes updating the symmetric key with a secure hardware extension key update protocol. The symmetric key is regionalized to accommodate a plurality of local regions.

In one or more embodiments of the method, the first compute device further includes a noncompliant circuit that is not compliant with the secure onboard communication protocol. An electronic control unit identification value and an unlock-electronic-control-unit-key are programmed into the noncompliant circuit for use during an authentication.

In one or more embodiments, the method includes allocating, in the first microcontroller unit circuit, additional key slots to remember one or more previously installed circuits in the first compute device; and clearing one or more keys for the one or more previously installed circuits based on a time lapse since last installed in the first compute device.

A system is provided herein. The system includes a first compute device and a second compute device. The first compute device is coupled to a local area network bus, and includes a first microcontroller unit circuit, a plurality of first processing circuits, and a first backplane bus. The second compute device is coupled to the local area network bus, and includes a second microcontroller unit circuit, a plurality of second processing circuits, and a second backplane bus. The first microcontroller unit circuit is operational to authenticate the plurality of first processing circuits with a plurality of first processor attestations over the local area network bus based on a secure onboard communication protocol of an automotive open system architecture, a symmetric key, and a first message authentication code. The plurality of first processing circuits is operational to reply to a respective one of the plurality of first processor attestations over the local area network bus. Secure communications through the first backplane bus among the plurality of first processing circuits is enabled based on the authentications of the plurality of first processing circuits and the authentications of the first microcontroller unit circuit. The second microcontroller unit circuit is operational to authenticate the plurality of second processing circuits with a plurality of second processor attestations over the local area network bus based on the secure onboard communication protocol, the symmetric key, and a second message authentication code. The plurality of second processing circuits is operational to reply to respective ones of the plurality of second processor attestations over the local area network bus. Secure communications through the second backplane bus among the plurality of second processing circuits is enabled based on the authentications of the plurality of second processing circuits and the authentications of the second microcontroller unit circuit.

In one or more embodiments of the system, the first central compute is coupled to a physical communication link, and further includes a first switch circuit and a first serial management bus. The first microcontroller unit circuit is further operational to: communicate with the first switch circuit over the first serial management bus; and generate a first allow list based on the authentications of the plurality of first processing circuits. The first switch circuit is operational to: translate data between the first backplane bus and the physical communication link; and enable the secure communications to the first backplane bus based on the first allow list. The second compute device is coupled to the physical communication link, and further includes a second switch circuit and a second serial management bus. The second microcontroller unit circuit is further operational to: communicate with the second switch circuit over the second serial management bus; and generate a second allow list based on the authentications of the plurality of second processing circuits. The second switch circuit is operational to: translate data between the second backplane bus and the physical communication link; and enable the secure communications to the second backplane bus based on the second allow list.

In one or more embodiments of the system, the first compute device is further operational to authenticate the second compute device with a first inter-compute device attestation over the physical communication link. The second compute device is further operational to authenticate the first compute device with a second inter-compute device attestation over the physical communication link. The first switch circuit is enabled to communicate with the second switch circuit over the physical communication link based on the authentication of the first compute device and the authentication of the second compute device.

In one or more embodiments, the system includes a vehicle that houses the first compute device and the second compute device.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 6 is a schematic diagram of a technique for key transport in accordance with one or more exemplary embodiments.

FIG. 7 is a schematic block diagram of a technique for new peripheral processing in accordance with one or more exemplary embodiments.

DETAILED DESCRIPTION

Embodiments of the present disclosure generally provide a system, apparatus, and/or method for symmetric key attestation of removable circuits. The removable circuits may be used in software-defined vehicles. Authenticating circuits attached to peripheral component interconnect express (PCIe) backplanes at scale for automotive applications are achieved by using symmetric key attestation with Secure Onboard Communications (SecOC) protocol authentication mechanisms of the Automotive Open System Architecture (AUTOSAR) and corresponding key schedules. In addition, the technique leverages existing device provisioning, registration, and Secure Hardware Extension (SHE) key update mechanisms. Circuits not compliant with the SecOC protocol are supported through a SecOC Abstraction Layer (SAL) located between compliant circuits that are compliant with the SecOC protocol and the noncompliant circuits.

Figure 1:
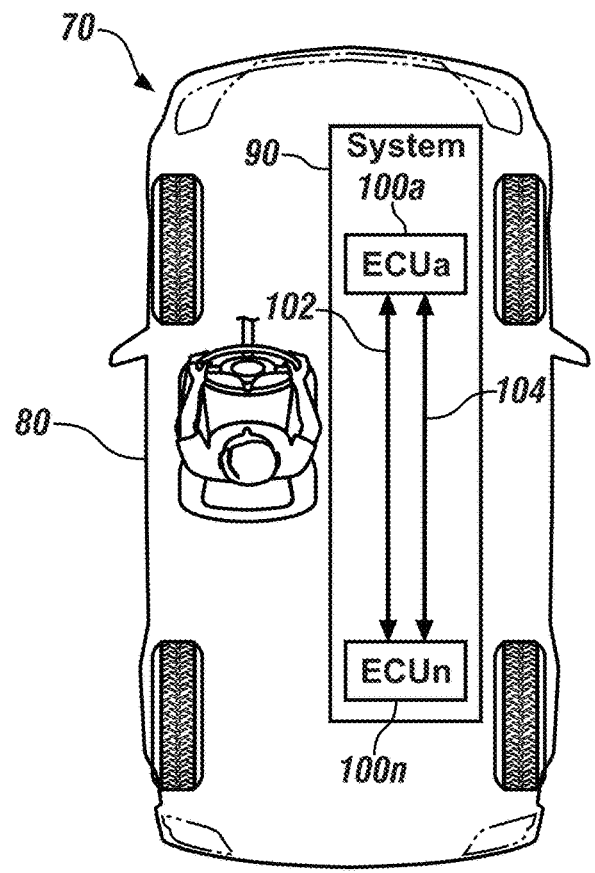
FIG. 1 is a schematic plan diagram of an environment around a vehicle in accordance with one or more exemplary embodiments.

Referring to FIG. 1, a schematic plan diagram of an example context of an environment 70 around a vehicle 80 is shown in accordance with one or more exemplary embodiments. The vehicle 80 has a system 90. The system 90 generally includes one or more electronic control units 100a-100n (two shown), a local area network bus 102, and a physical communication link 104.

The vehicle 80 implements a gas-powered vehicle, an electric vehicle, a hybrid vehicle, or a plug-in hybrid vehicle. In various embodiments, the vehicle 80 may include, but is not limited to, a passenger vehicle, a truck, an autonomous vehicle, a gas-powered vehicle, an electric-powered vehicle, a hybrid vehicle, a motorcycle, a boat, and/or an aircraft. Other types of vehicles 80 may be implemented to meet the design criteria of a particular application. The vehicle 80 houses (or carries) the system 90 and components within the system 90.

The system 90 implements an electrical system in a software-defined vehicle. The system 90 includes the electronic control units 100a-100n, sensors, actuators, communications circuitry, and the like. The system 90 has field-replaceable components (e.g., circuit, cartridges, and/or devices). The field-replaceable components may be accessible by renters and/or owners of the vehicle 80.

Each electronic control unit (ECU) 100a-100n implements one or more digital computation circuits within an apparatus. Each electronic control unit 100a-100n has a corresponding housing that enclose the digital computation circuits. The digital computation circuits within an individual ECU 100a-100n may exchange data with each other across an internal backplane bus. Some digital computation circuits may transfer data among the electronic control units 100a-100n via the local area network bus 102 and the physical communication link 104. The digital computation circuits may be implemented in hardware, software executing on hardware, or a combination of both.

The local area network bus 102 implements a computer network. In various embodiments, the local area network bus 102 may be an Ethernet bus, an Inter-Integrated Circuit ($I^2C$) bus, a Serial Peripheral Interface (SPI) bus, and/or a Universal Asynchronous Receiver-Transmitter (UART) bus. The local area network bus 102 is operational to facilitate device authentications. The local area network bus 102 may be used as an out-of-band communication path (or channel)

by the ECUs 100a-100n for attestation challenge messages and response messages of the authentications.

The physical communication link 104 implements a serial digital bus. In various embodiments, the physical communication link 104 may be implemented as a peripheral component interconnect express (PCIe) bus. Other communication buses may be implemented to meet the design criteria of a particular application. For some applications, the physical communication link 104 is operational to transfer data internally within individual electronic control units 100a-100n. For other applications, the physical communication link 104 is operational to transfer data between the ECUs 100a-100n. The attestation challenge messages and the response messages to authenticate the circuitry attached to the physical communication link 104 traverses the physical communication link 104.

Figure 2:
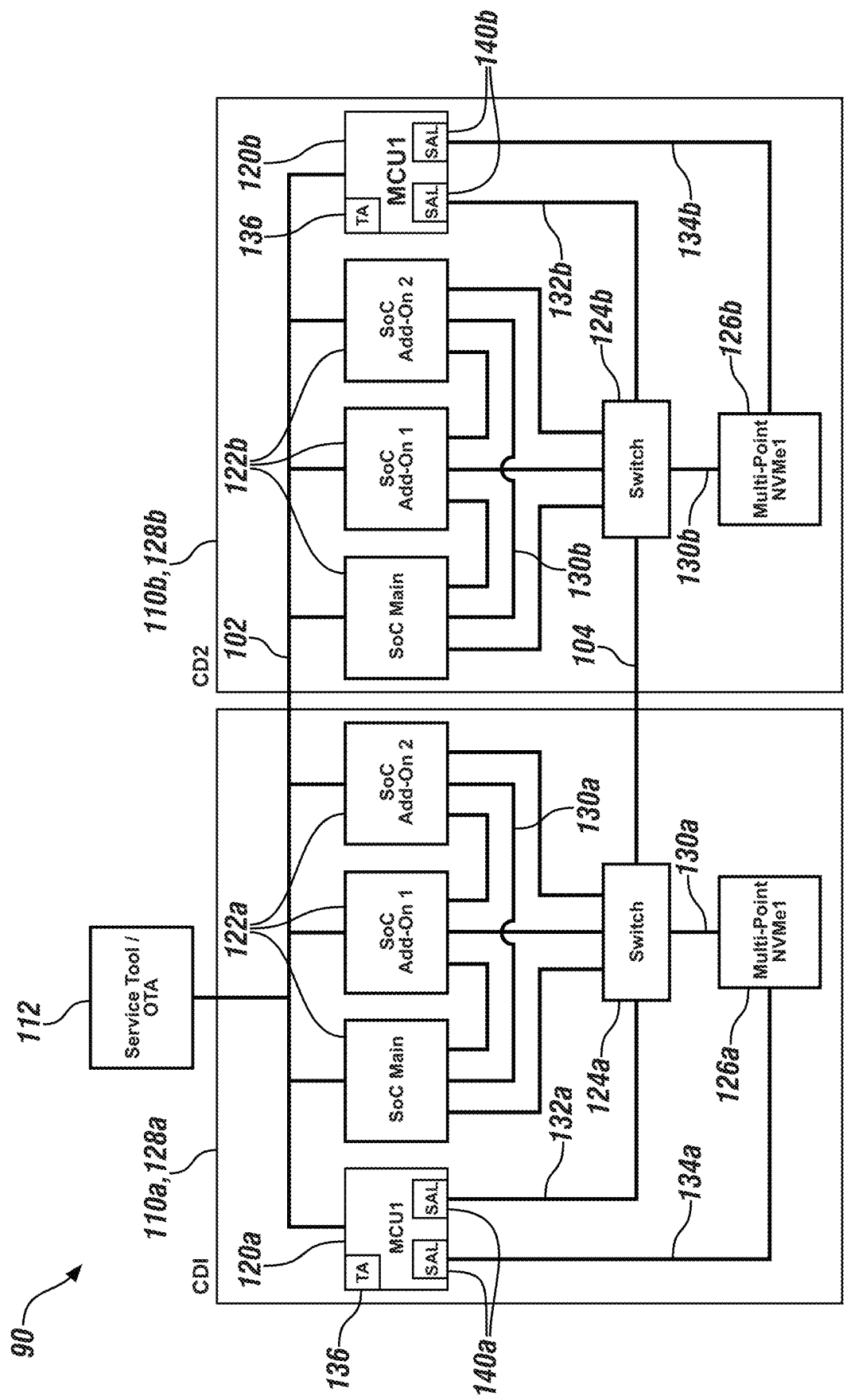
FIG. 2 is a schematic block diagram of a system with multiple compute devices in accordance with one or more exemplary embodiments.

Referring to FIG. 2, a schematic block diagram of an example implementation of a system 90 with multiple compute devices is shown in accordance with one or more exemplary embodiments. In the example, the system 90 includes the local area network bus 102, the physical communication link 104, multiple (two illustrated) compute devices (CDs) 110a-110b, and a service tool/over-the-air (OTA) port 112. In various embodiments, the compute devices 110a-110b are housed in a common ECU (e.g., 100a in FIG. 1). In other embodiments, the compute devices 110a-110b are housed in different ECUs (e.g., 100a and 100n in FIG. 1). The compute devices 110a-110b are couplable to the local area network bus 102.

A first compute device 110a includes a first microcontroller unit circuit (MCU) 120a, one or more first processing circuits 122a (three illustrated), one or more first switch circuits 124a (one illustrated), one or more first memory circuits 126a (one illustrated), a first backplane 128a, a first backplane bus 130a, one or more first serial management buses 132a (one illustrated), and one or more first memory management buses 134a (one illustrated) within an apparatus. The first microcontroller unit circuit 120a and the first processing circuits 122a are connected to the local area network bus 102. The first processing circuits 122a, the first switch circuit 124a, and the first memory circuit 126a are connected to the first backplane bus 130a. The first microcontroller units 120a and the first switch circuits 124a are connected to the first serial management bus 132a. The first microcontroller unit circuit 120a and the first memory circuit 126a are connected to the first memory management bus 134a. First SecOC abstraction layers (SAL) 140a are provided by the first microcontroller unit circuit 120a.

A second local compute device 110b includes a second microcontroller unit circuit (MCU) 120b, one or more second processing circuits 122b (three illustrated), one or more second switch circuits 124b (one illustrated), one or more second memory circuits 126b (one illustrated), a second backplane 128b, a second backplane bus 130b, one or more second serial management buses 132b (one illustrated), and one or more second memory management buses 134b (one illustrated). The second microcontroller unit circuit 120b and the second processing circuits 122b are connected to the local area network bus 102. The second processing circuits 122b, the second switch circuit 124b, and the second memory circuit 126b are connected to the second backplane bus 130b. The second microcontroller unit circuit 120b and the second switch circuit 124b are connected to the second serial management bus 132b. The second microcontroller unit circuit 120b and the second memory circuit 126b are connected to the second memory management bus 134b. Second SecOC abstraction layers (SAL) 140b are provided by the second microcontroller unit circuit 120b.

The service tool/over-the-air port 112 implements a wired node and/or a wireless node connectable to the local area network bus 102 (e.g., connected to the local area network bus 102 via the first compute device 110a, as illustrated). The service tool/over-the-air port 112 is operational to enable programming used to update firmware, software, and/or encryption keys in the circuitry within the vehicle 80.

The first microcontroller unit circuit 120a and the second microcontroller unit circuit 120b implement microcontrollers. The microcontroller unit circuits 120a-120b are permanently connected to the respective compute devices 110a-110b. In various embodiments, the permanent connections are achieved by soldering, gluing, and/or riveting the microcontroller unit circuits 120a-120b to the respective backplanes 128a-128b. The microcontroller unit circuits 120a-120b are designated as trust anchors (TA) 136 and are operational to provide general board management control.

The first microcontroller unit circuit 120a and the second microcontroller unit circuit 120b each include processing resources, tangible non-transitory memory, and transitory memory. For example, the first microcontroller unit circuit 120a and the second microcontroller unit circuit 120b may include application-suitable amounts of random-access memory, read-only memory, flash memory and other types of electrically erasable programmable read-only memory, as well as accompanying hardware in the form of a high-speed clock or timer, analog-to-digital and digital-to-analog circuitry, and input/output circuitry and devices, as well as appropriate signal conditioning and buffer circuitry.

Computer-readable and executable instructions embodying the present method may be recorded (or stored) in the memory and executed as set forth herein. The executable instructions may be a series of instructions employed to run applications on the first microcontroller unit circuit 120a and/or the second microcontroller unit circuit 120b (either in the foreground or background). The first microcontroller unit circuit 120a and/or the second microcontroller unit circuit 120b may receive commands and information, in the form of one or more input signals from various controls and/or components in the vehicle 80, and communicate instructions to the other electronic components.

The first processing circuits 122a and the second processing circuits 122b implement replaceable devices within the respective compute devices 110a-110b. The first processing circuits 122a and the second processing circuits 122b are operable to communicate on the local area network bus 102 and the respective memory management buses 134a-134b through connectors on the respective backplanes 128a-128b. The processing circuits 122a-122b are operational to provide the main functionality of the compute devices 110a-110b.

The first processing circuits 122a and the second processing circuits 122b each include processing resources, tangible non-transitory memory, and transitory memory. For example, the first processing circuits 122a and the second processing circuits 122b may include application-suitable amounts of random-access memory, read-only memory, flash memory and other types of electrically erasable programmable read-only memory, as well as accompanying hardware in the form of a high-speed clock or timer, analog-to-digital and digital-to-analog circuitry, and input/output circuitry and devices, as well as appropriate signal conditioning and buffer circuitry.

Computer-readable and executable instructions embodying the present method may be recorded (or stored) in the memory and executed as set forth herein. The executable instructions may be a series of instructions employed to run applications on the first processing circuits 122a and/or the second processing circuits 122b (either in the foreground or background). The first processing circuits 122a and/or the second processing circuits 122b may receive commands and information, in the form of one or more input signals from various controls and/or components in the vehicle 80, and communicate instructions to the other electronic components.

The first switch circuit 124a and the second switch circuit 124b implement bus switching circuits. In various embodiments, the switch circuits 124a-124b may implement peripheral component interconnect express switches. The first switch circuit 124a and the second switch circuit 124b are permanently connected to the respective compute devices 110a-110b. In various embodiments, the permanent connections are achieved by soldering, gluing, and/or riveting the switch circuits 124a-124b to the respective backplanes 128a-128b.

The first switch circuit 124a and the second switch circuit 124b are operational to route (and translate where appropriate) bus traffic on the backplane buses 130a-130b between the processing circuits 122a-122b and the memory circuits 126a-126b, respectively. The first switch circuit 124a and the second switch circuit 124b are also operational to translate and route bus traffic between the first microcontroller unit circuit 120a and the second microcontroller unit circuit 120b via the physical communication link 104.

The first memory circuit 126a and the second memory circuit 126b implement multiport non-volatile solid-state memories and/or solid-state drives (SSD). The memory circuits 126a-126b are removably connected to the compute device 110a-110b. The memory circuits 126a-126b communicate on the respective backplane buses 130a-130b and the respective memory management buses 134a-134b.

The memory circuits 126a-126b are operational to store data and instructions for the compute devices 110a-110b. In various embodiments, the memory circuits 126a-126b may be compliant with the Non-Volatile Memory Express (NVMe) or Non-Volatile Memory Host Controller Interface Specification (NVMHCIS). Other memory interface specifications may be implemented to meet the design criteria of a particular application.

The first backplane 128a and the second backplane 128b implement computer mother boards. The backplanes 128a-128b include conductive traces for the local area network bus 102, the physical communication link 104, the backplane buses 130a-130b, the serial management buses 132a-132b, and the memory management buses 134a-134b. The backplanes 128a-128b generally include sockets to accommodate insertion and removal of the processing circuits 122a-122b and the memory circuits 126a-126b. Mounting hardware is included in the backplanes 128a-128b to secure the microcontroller unit circuits 120a-120b and the switch circuits 124a-124b.

The first backplane bus 130a and the second backplane bus 130b each implement multiple peripheral component interconnect express (PCIe) buses. For example, one PCIe bus 130a may form a point-to-point link (or connection) between one first processing circuit 122a and the first switch circuit 124a. Another PCIe bus 130a may form another point-to-point link (or connection) between two first processing circuits 122a, and so on. The backplane buses 130a-130b provide a standard interface for conveying high-speed data among the circuitry within the compute devices 110a-110b. Other bus standards may be implemented to meet the design criteria of a particular application.

The serial management buses 132a-132b implement inter-integrated circuit (I²C) buses. The serial management buses 132a-132b may be synchronous, multi-master/multi-slave, single-ended, serial digital buses. Other bus standards may be implemented to meet the design criteria of a particular application.

The memory management buses 134a-134b implement System Management Bus (SMBus). The memory management buses 134a-134b may be single-ended simple two-wire buses for the purpose of lightweight communication. Other bus standards may be implemented to meet the design criteria of a particular application.

The first SecOC abstraction layer 140a and the second SecOC abstraction layer 140b are located between compliant SecOC circuits (e.g., the microcontroller unit circuits 120a-120b) and noncompliant SecOC circuits (e.g., the switch circuits 124a-124b and the memory circuits 126a-126b). The SecOC abstraction layers 140a-140b are operational to provide SecOC-like authentication mechanism communications with the noncompliant SecOC circuits.

In various embodiments, the buses 132a, 132b, 134a, and 134b generally provide out-of-band (OOB) management interfaces primarily used for device configuration, calibration, and diagnostics. The out-of-band management may not be used for the primary device function, such as traffic management (switch) or storage (NVMe SSD). The out-of-band management generally provides device access even when the main communications path is not working. In other embodiments, in-band management may be implemented due to physical limitations of adding the out-of-band communications to separate extension modules, such as a separate (NVMe SSD) storage enclosure for the memory circuits 126a-126b.

The symmetric key attestation over the SecOC protocol leverages automotive message authentication techniques as well as key provisioning, distribution, and updates methods. Such techniques allow authentication of field replaceable components at scale using proven techniques. The attestation over SecOC may be performed using trusted out-of-band channels, such as Ethernet, SMBus, SPI, and/or UART. The attestation over SecOC may be performed using in-band paths, such as PCIe, through abstraction layers. Therefore, the various inter-circuit communication links may be disabled until the authentications are complete.

The symmetric key attestation is faster than asymmetric techniques, which is useful for fast vehicle startups. The symmetric key attestation also limits scaling of compromised secret keys. With asymmetric procedures, if a private/public key pair becomes compromised, the keys may be cloned and scaled. Mitigation of compromised key pairs involves periodic monitoring, detection, and discrimination of identical public keys with concomitant infrastructure support. Mitigation of a compromised symmetric key is limited to the impacted key pairs. An internet connection and one-time registration to provision keys may be used to configure newly installed circuits in the compute devices 110a-110b. The internet connection also supports updating standard SecOC keys and configuration tables.

The symmetric key attestation over the SecOC protocol may be viewed from two perspectives. In a first perspective, unauthenticated circuits (or components or devices) may be plugged into a compute device. In a second perspective, freestanding circuits may be plugged into debuggers, lab equipment, and/or similar interfaces where memory may be modified before installation in a vehicle. Such circuits are owner upgradeable, and so the supply chain is less secure than intended. As such, a defining characteristic is that the system uses symmetric key attestation to mutually authenticate circuits—a compute device authenticates removable circuits (perspective 1) and replaceable circuits authenticate (or verify) the compute device (perspective 2). The mutual attestation is also used to detect unauthenticated PCI circuits that are plugged into the vehicle circuitry using cartridge connectors and/or inter-board cables. The mutual attestation lets such components authenticate the compute devices and vice versa before allowing communications over the PCIe links.

For circuits or other field replaceable devices, each serial connection (not just the PCIe links) are treated as public connections at startup until the attestation procedures complete. Before the attestation procedures begin, the microcontroller unit circuits are initialized. At initialization, an option exists to lock out traffic or restrict the traffic to well-defined messages and operations (e.g., unsecured communications) until the attestations over SecOC successfully complete. Field replaceable circuits that are not legitimate may start up in normal fashion, but serial communications to and from the replaceable circuits may be restricted and/or inhibited.

In various embodiments, allow lists and deny lists are generated by a single circuit during attestation and distributed to connected circuitry. In other embodiments, the allow lists and deny lists are be built by each individual circuit separately with no distribution. The former is generally faster; the latter may be better suited to architectural changes and forwards/backwards compatibility.

The automotive open system architecture is a development partnership of automotive interested parties. At a high level of abstraction, the automotive open system architecture provides three software layers running on a microcontroller: Application, Runtime Environment (RTE), and Basic Software (BSW), and provides a modular and scalable approach to software development. The automotive open system architecture specification is available at www.autosar.org.

The secure hardware extension (SHE) provides an on-chip extension to microcontrollers that moves control of cryptographic keys from a software domain into a hardware domain to protect the keys from software attacks. The secure hardware extension specification is available at www.vector.com.

Figure 3:
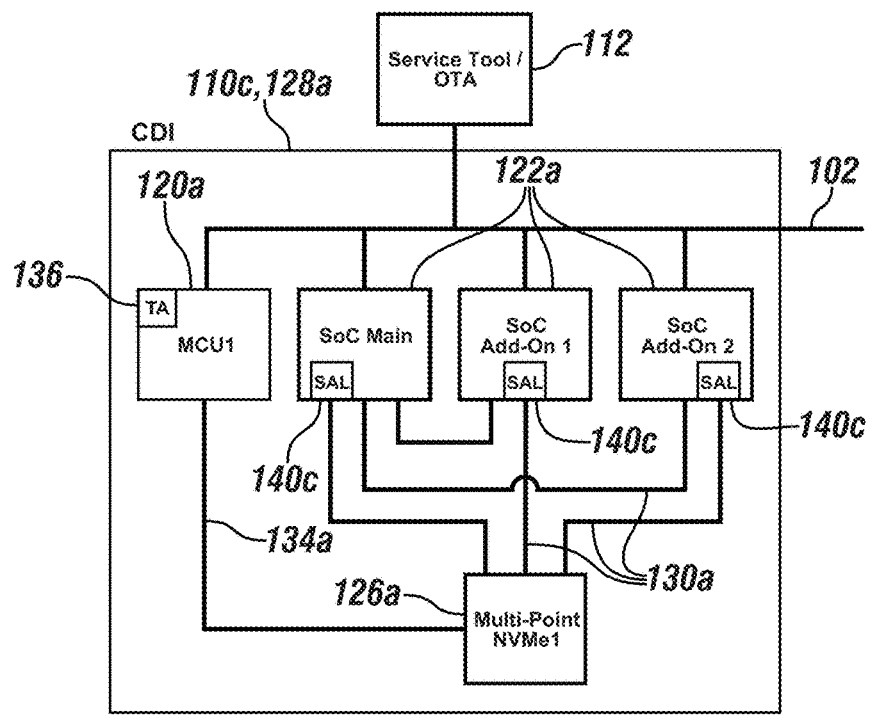
FIG. 3 is a schematic block diagram of another compute device in accordance with one or more exemplary embodiments.

Referring to FIG. 3, a schematic block diagram of an example implementation of a compute device 110c is shown in accordance with one or more exemplary embodiments. The compute device 110c may be a variation of the compute devices 110a and/or 110b. The compute device 110c includes the local area network bus 102, the first microcontroller unit circuit 120a, the multiple first processing circuits 122a, and the first memory circuit 126a. The first switch circuit is absent. The local area network bus 102 may be connected to the service tool/over-the-air port 112. The first microcontroller unit circuit 120a is designated as the trust anchor 136.

In various embodiments, the first memory circuit 126a may implemented as NVMe over fabrics (NVMe-oF). Fabrics include InfiniBand, Fiber Channel, RDMA over Converged Ethernet (RoCE), iWARP computer network protocol, and Transmission Control Protocol (TCP). The NVME-OF approach may enable disaggregation and improve cable distances (e.g., greater than 2 meters).

For NVMe over TCP, Ethernet may be used at the SoC level and an Ethernet-to-PCIe converter is used to connect the Ethernet to the memory circuits. Such an architecture enables standard Ethernet cables to interface with an NVMe SSD storage bay and place the converter in the bay. The architecture may reduce costs compared with using PCIe cables, which are high-speed but have limited cable run lengths and require expensive supporting electronics, such as retimers. In-band device management is particularly useful for NVMe-OF since the target device may be located remotely from the SoCs and board management controllers (disaggregation).

The compute device 110c illustrates an example of symmetric key attestation over PCIe (in-band). The SecOC abstraction layers 140c exists between the first processing circuits 122a and a non-SecOC peripheral, such as the memory circuit 126a. Each first processing circuits 122a is responsible for authenticating its connection to the peripheral. Alternatively, a single first processing circuit 122a may authenticate the peripheral and distribute an updated allow list. Here, SecOC keys and crypto engine are used in the first processing circuits 122a but are translated through the abstraction layers 140c to generate challenge messages and response messages to the peripheral over the first backplane bus 130a.

For interoperability with circuits that do not support SecOC, the abstraction layers 140c provide an interface to non-compliant SecOC circuits. For example, if a cipher-based message authentication code is customarily used for SecOC message authentication but a non-compliant device calculates hash-based message authentication codes (HMACs), the abstraction layers 140c use the symmetric keys with a local cryptographic service to calculate the HMACs.

Figure 4:
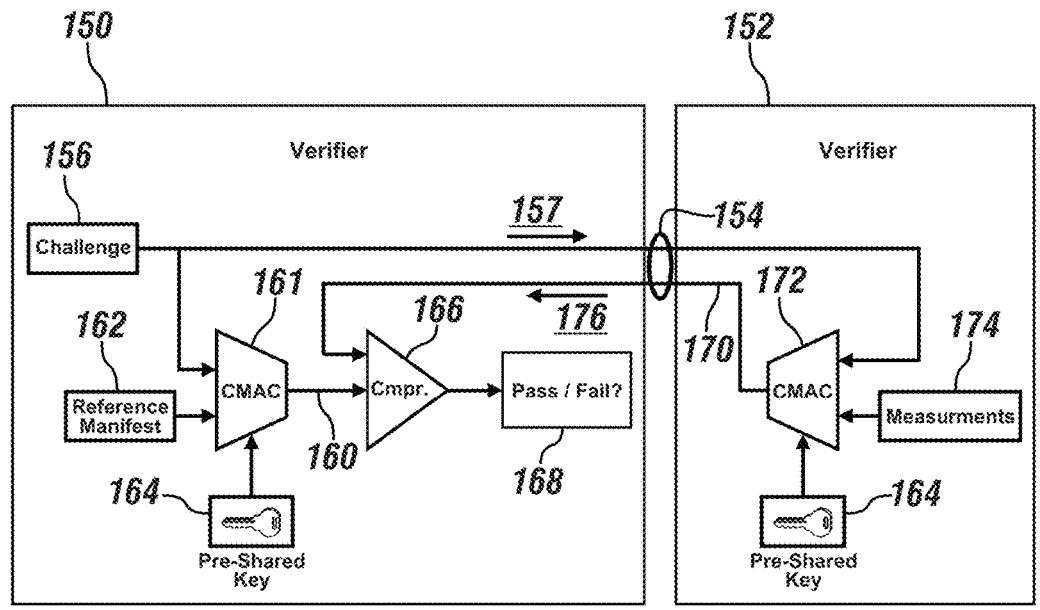
FIG. 4 is a schematic block diagram of an attestation in accordance with one or more exemplary embodiments.

Referring to FIG. 4, a schematic block diagram of an example attestation is shown in accordance with one or more exemplary embodiments. The attestation involves a verifier 150 and an attester 152 in communication across a bus 154. For example, the verifier 150 may be one of the first processing circuits 122a, the attester 152 may be another of the first processing circuits 122a, and the bus 154 may be the first backplane bus 130a shown in FIG. 2. In another example, the verifier 150 may be the first microcontroller unit circuit 120a and the attester 152 may be one of the first processing circuits 122a. Other combinations of verifiers 150 and attesters 152 are possible. In general, the roles of the verifier and attester may be reversed to provide mutual attestation. Different pre-shared keys may be used in each direction to prevent a challenge from being reflected back to the source where a valid response would be calculated by the source. For symmetric key attestation over SecOC, different keys are used for calculating CMACs in either direction.

The verifier 150 may access a challenge code (or value) 156. The challenge code 156 is transferred across the bus 154 within a challenge message 157 to the attester 152. The verifier 150 generates a first code 160 using a Cipher-based Message Authentication Code (CMAC) 161. The CMAC 161 processes the challenge code 156 and a reference manifest value 162 using a pre-shared symmetric key 164. The attester 152 generates a second code (or value) 170 using another CMAC 172. The CMAC 172 processes the challenge code 156 and a measurement value 174 using the pre-shared symmetric key 164. The measurement value 174 may be a metric of the firmware, software, hardware, and/or some permutation thereof. The second code 170 is transferred within a response message 176 from the attester 152 back to the verifier 150 via the bus 154. The verifier 150 compares 166 the first code 160 to the second code 170. If the two codes 160 and 170 match, the verifier 150 concludes a pass as an attestation result 168. If the two codes 160 and 170 do not match, the verifier 150 concludes a failure as the attestation result 168.

The cipher-based message authentication codes provide a tool for calculating message authentication codes using a block cipher coupled with the symmetric key 164. An integrity and an authenticity of a message may be verified by the cipher-based message authentication codes.

Figure 5:
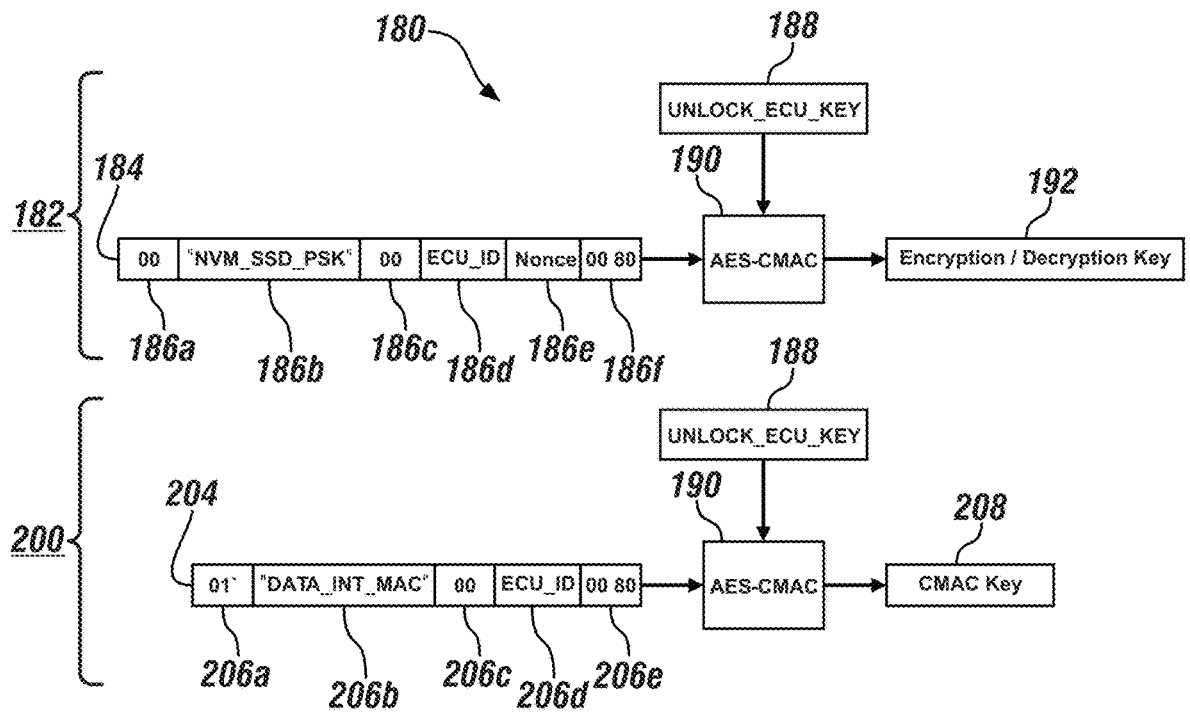
FIG. 5 is a schematic diagram of a technique for key derivation in accordance with one or more exemplary embodiments.

Referring to FIG. 5, a schematic diagram of an example technique for key derivation is shown in accordance with one or more exemplary embodiments. The technique 180 includes a process 182 and a process 200. The process 182 encrypts an input block 184 with an Advanced Encryption Standard (AES)-CMAC cipher 190 using an UNLOCK_ECU_KEY 188 (unlock-electronic-control-unit-key) to generate an encryption/decryption key 192. The input block 184 includes multiple fields 186a-186f. The fields 186a, 186c and 186f may contain fixed bit patterns. The field 186b contains a Pre-Shared Key (PSK) value of the memory circuit. The PSK value is a password used as the "key" to activate the secure network. The field 186d contains an ECU identification (ECU_ID) value. The field 186e may contain a nonce value from the target component. The process 200 encrypts an input block 204 with the Advanced Encryption Standard (AES)-CMAC cipher 190 using the UNLOCK_ECU_KEY 188 to generate a CMAC key 208. The input block 204 includes multiple fields 206a-206e. The fields 206a, 206c and 206e may contain fixed bit patterns. The field 206b contains a DATA_INT_MAC value. The DATA_INT_MAC value is a MAC value of internal data. The field 206d contains the ECU identification value. The process 182 and the process 200 are common to both an office environment and the NVMe SSD controller so that each side may generate encryption/decryption and CMAC keys using only public information (ECU_ID, nonce). The "NVME_SSD_PSK" value and the "DATA_INT_MAC" value may be fixed ASCII string labels used to generate different input material for the same ECU_ID. By having different input material, the encryption/decryption key and CMAC keys are different. In various embodiments, the nonce may be eliminated for the CMAC key resulting in a fixed CMAC key for each ECU_ID.

Some PCIe components, such as the memory circuits 126 (see FIG. 2), do not support the AUTOSAR standard or the SHE standard. To allow vendor specific attestation, zeroed attestation keys are used in component manufacturing and final attestation keys are securely sent to the component in final assembly or integration. Secure transport is established by programming the ECU identification value and a matched UNLOCK_ECU_KEY 188 at a time of component manufacturing, and retrieving the nonce from the target component during the procedure. The values are used to derive the encryption/decryption key 192 and the CMAC key 208. The AES-CMAC ciphers 190 allow key encryption and authentication of a device-specific final attestation key (e.g., the symmetric key for secure transport). The idea is to have a final attestation key that may be updated once to prevent replay attacks (e.g., someone records the update procedure and replays the update procedure at a later time. Such an approach may be useful if a key became compromised and so is updated to a new key; an attacker would want to re-install the old, compromised key, that would fail the attestations.

Referring to FIG. 6, a schematic diagram of an example technique for key transport is shown in accordance with one or more exemplary embodiments. The technique 210 includes a process 212 and a process 220. The process 212 and the process 220 are implemented in an office environment.

The process 212 encodes an attestation PSK plaintext block 214 for transportation with an AES-128 electronic codebook mode (ECB) cipher 216 using the encryption/decryption key 192 to generate an attestation PSK ciphertext block 218. The attestation PSK plaintext block 214 eventually becomes the pre-shared symmetric key 164 (FIG. 4) after transportation to and installation in a compute device 110a-110b. The process 220 encodes a portion of an input block 222 (e.g., fields 224a-224c) with the AES-CMAC cipher 190 using the CMAC key 208 to generate the second code 170 (see FIG. 4). The input block 222 includes multiple fields 224a-224d. The field 224a may contain the ECU identification value. The field 224b may contain the nonce value. The field 224c contains the attestation PSK ciphertext block 218. The field 224d is used to store the second code 170 generated by the AES-CMAC cipher 190. The technique 210 generally provides encryption and authentication of the final attestation for secure transport in the office environment (e.g., encrypt then MAC).

Referring to FIG. 7, a schematic block diagram of an example technique for new peripheral processing is shown in accordance with one or more exemplary embodiments. The technique 230 includes a process 232 and a process 234. The process 232 and the process 234 are implemented outside the office environment to where the block 222 has been transported.

The process 232 encodes the portion of the input block 222 (e.g., the fields 224a-224c) with the AES-CMAC cipher 190 using the CMAC key 208 to generate the first code 160. The second code 170 is extracted from the field 224d of the input block 222. The extracted second code 170 is compared 166 to the first code 160 to determine the pass/failure attestation result 168.

In the process 234, the attestation PSK ciphertext block 218 is extracted from the input block 222. The attestation PSK ciphertext block 218 is decrypted with an AES-128 ECB decryption 236 using the encryption/decryption key 192 to recover the attestation PSK plaintext 226 of the attester 152. The recovered attestation PSK plaintext 226 is used as the pre-shared symmetric key 164 (FIG. 4). The technique 230 generally provides authentication and decryption of final attestation key in the NVMe SSD controller (e.g., MAC then decrypt).

Figure 8:
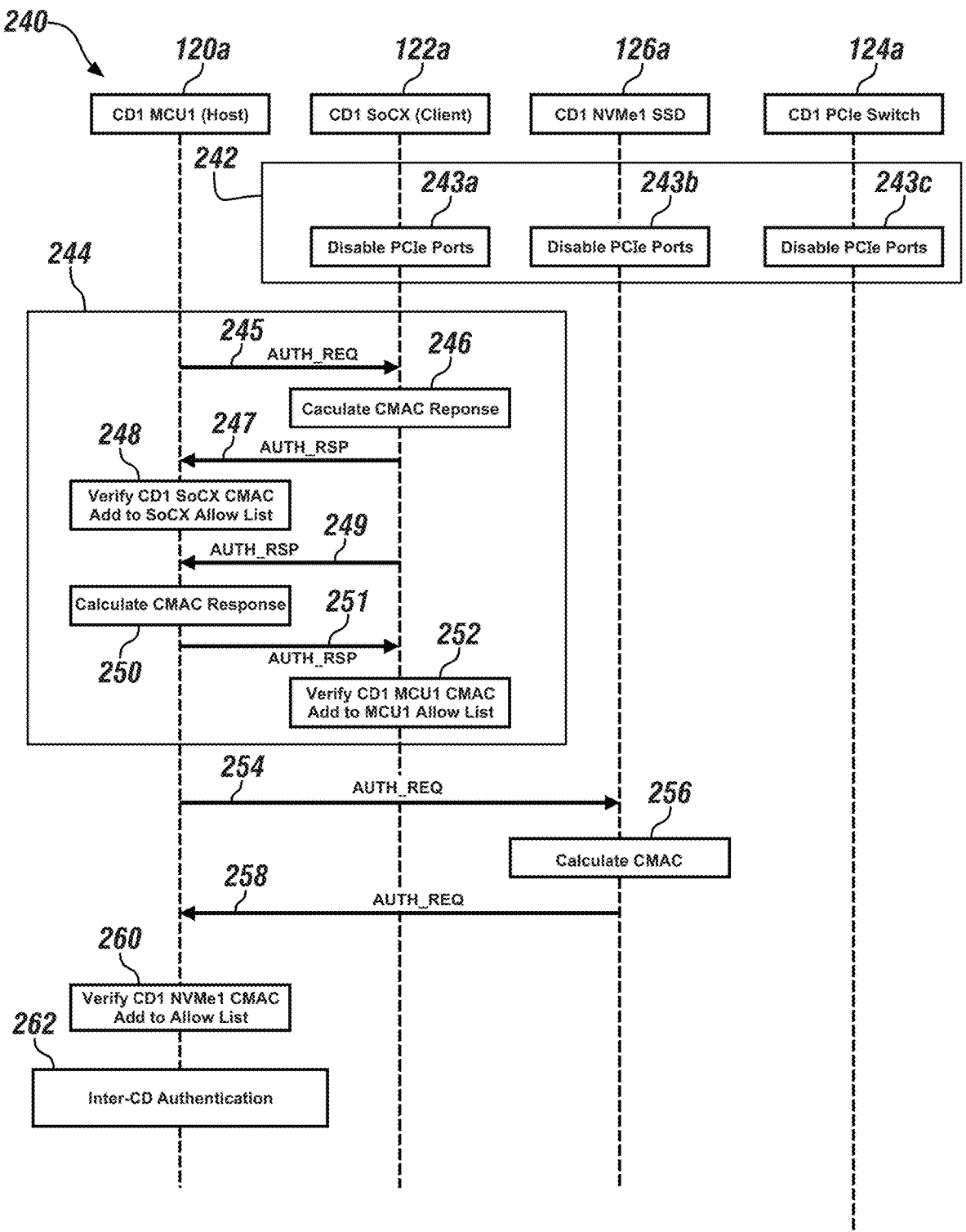
FIG. 8 is a flow diagram of a method for authentication within a compute device in accordance with one or more exemplary embodiments.

Referring to FIG. 8, a flow diagram of an example method 240 for authentication within a compute device is shown in accordance with one or more exemplary embodiments. The method 240 is illustrated for the first compute device 110a. The method (or process) 240 includes steps 242 to 262, as illustrated. The sequence of steps is shown as a representative example. Other step orders may be implemented to meet the criteria of a particular application.

A centralized job scheduler, run from a trust anchor (TA) in each local compute device 110a-110b, may be run at boot time, after a removeable circuit is detected as newly installed, after a removeable circuit is detected as removed, or at other defined events. The job scheduler logic is symmetric so that each scheduler assesses components within the local compute device 110a-110b. The trust anchors generally authenticate each other. The mutual authentication allows ad hoc topology changes without additional code or library support. The attestation procedure starts with bus ports disabled or restricted, builds out an allow list for each local compute device 110a-110b, and distributes the allow list to the authenticated circuits. The bus ports for allowed circuits are enabled whereas the bus ports to unauthenticated circuits are left disabled.

In the step 242, the first processing circuits 122a, the first switch circuit 124a, and the first memory circuit 126a may disable or restrict ports 243a-243c to the first backplane bus 130a. The first microcontroller unit circuit 120a and the first processing circuits 122a may authenticate each other in the step 244 with a mutual attestation. The mutual attestations involve the first microcontroller unit circuit 120a sending an authorization request message (e.g., a challenge message 157, FIG. 4) to each first processing circuit 122a in the step 245. The authorization request messages may be sent sequentially to one first processing circuit 122a at a time, or broadcast to the first processing circuits 122a contemporaneously. Each first processing circuit 122a calculates a CMAC response in the step 246. The CMAC responses are returned to the first microcontroller unit circuit 120a in the step 247. The first microcontroller unit circuit 120a uses the internally generated challenge code and the received response values to authenticate/verify the individual first processing circuits 122a in the step 248. If the verifications pass/fail, the first microcontroller unit circuit 120a adds the first processing circuits 122a to the first allow list/first deny list as part of the step 248.

In the step 249, the first processing circuits 122a each send an authorization request message to the first microcontroller unit circuit 120a. The first microcontroller unit circuit 120a calculates CMAC responses in the step 250 and sends the responses to the first processing circuits 122a in the step 251. The first processing circuits 122a authenticate/verify the CMAC responses in the step 252. If the verifications pass/fail, the first processing circuits 122a add the first microcontroller unit circuit 120a to the first allow list/first deny list as part of the step 252.

In the step 254, the first microcontroller unit circuit 120a sends an authorization request message to the first memory circuit 126a (e.g., a first memory attestation). The first memory circuit 126a calculates a CMAC response in the step 256. An authorization response message is sent by the first memory circuit 126a back to the first microcontroller unit circuit 120a in the step 258. The first microcontroller unit circuit 120a authenticates/verifies the first memory circuit 126a in the step 260 and adds the first memory circuit 126a to the allow list/deny list where the verification passes/fails. In the step 262, the first microcontroller unit circuit 120a may perform an inter-compute device authentication to link with the second microcontroller unit circuit 120b (see FIG. 12).

Figure 9:
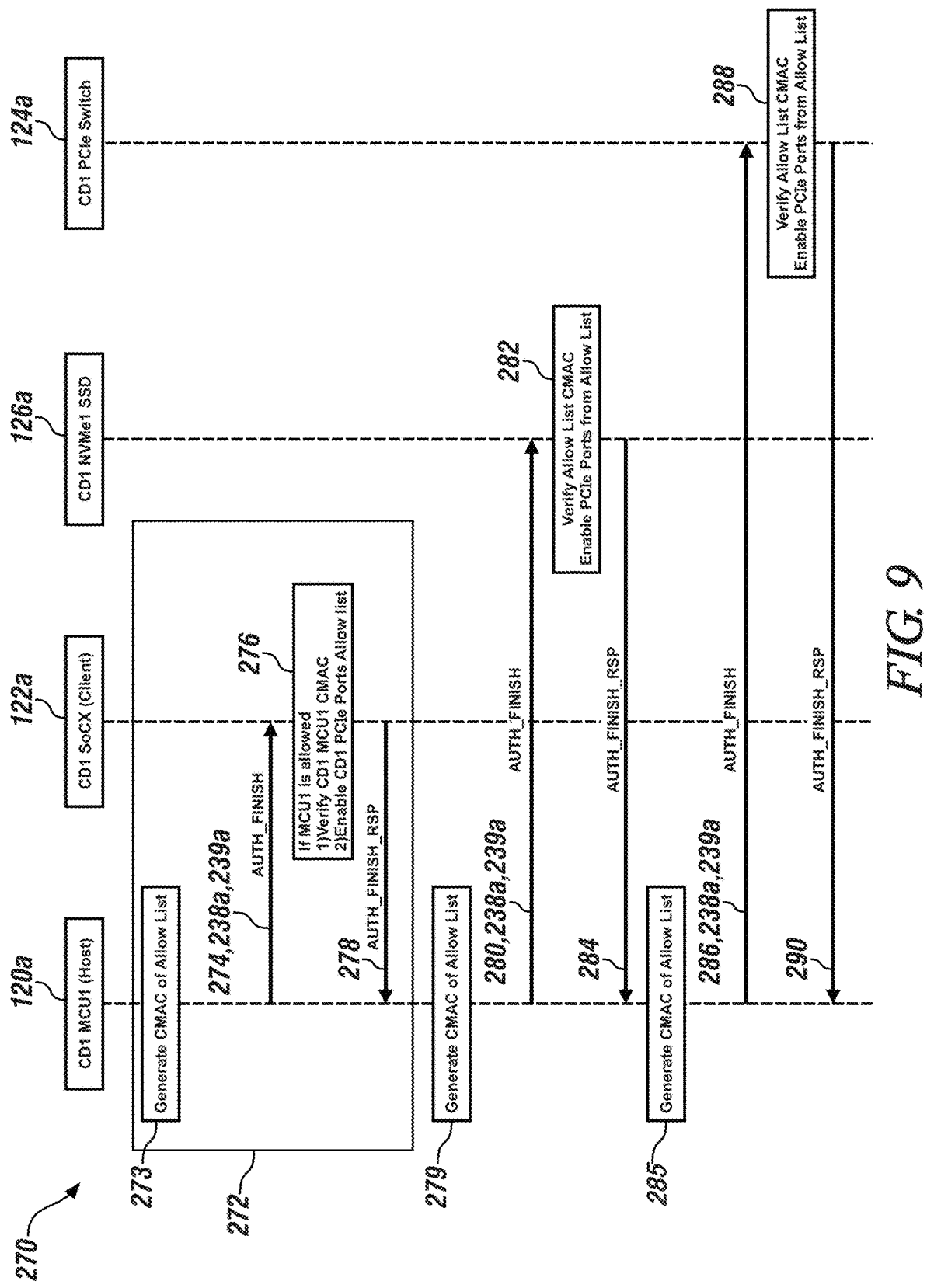
FIG. 9 is a flow diagram of a method for finishing authentication within the compute device in accordance with one or more exemplary embodiments.

Referring to FIG. 9, a flow diagram of an example method 270 for finishing authentication within the compute device is shown in accordance with one or more exemplary embodiments. The method 270 is illustrated for the first compute device 110a. The method (or process) 270 includes steps 272 to 290, as illustrated. The sequence of steps is shown as a representative example. Other step orders may be implemented to meet the criteria of a particular application.

In the step 272, the first microcontroller unit circuit 120a notifies the first processing circuits 122a that the authentication has ended. The first microcontroller unit circuit 120a generates a CMAC of the allow/deny lists relative to the first processing circuits 122a in the step 273, and sends an authorization finished message with a first allow list 238a and a first deny list 239a to each first processing circuit 122a in the step 274. The authorization finished messages may be sent sequentially to one first processing circuit 122a at a time, or broadcast to the first processing circuits 122a contemporaneously. If the first microcontroller unit circuit 120a was previously allowed, each first processing circuit 122a verifies the first allow list 238a in the step 276 and enables the first backplane bus ports identified in the first allow a list 238a for secure communications. The first processing circuits 122a send respective authentication finished responses back to the first microcontroller unit circuit 120a in the step 278. The step 278 is an acknowledgement for the initiator and is used for error handling.

The first microcontroller unit circuit 120a generates a CMAC of the allow/deny lists relative to the first memory circuit 126a in the step 279. In the step 280, the first microcontroller unit circuit 120a sends the authorization finished message with the first allow list 238a and a first deny list 239a to the first memory circuit 126a. The first memory circuit 126a verifies the first allow list 238a based on the CMAC in the step 282 and enables the first backplane bus ports identified in the first allow a list 238a. The first memory circuit 126a sends an authentication finished response back to the first microcontroller unit circuit 120a in the step 284.

The first microcontroller unit circuit 120a generates a CMAC of the allow/deny lists relative to the first switch circuit 124a in the step 285. In the step 286, the first microcontroller unit circuit 120a sends the authorization finished message with the first allow list 238a and a first deny list 239a to the first switch circuit 124a. The first switch circuit 124a verifies the first allow list 238a in the step 288 and enables the first backplane bus ports identified in the first allow a list 238a. The first switch circuit 124a sends an authentication finished response back to the first microcontroller unit circuit 120a in the step 290.

Figure 10:
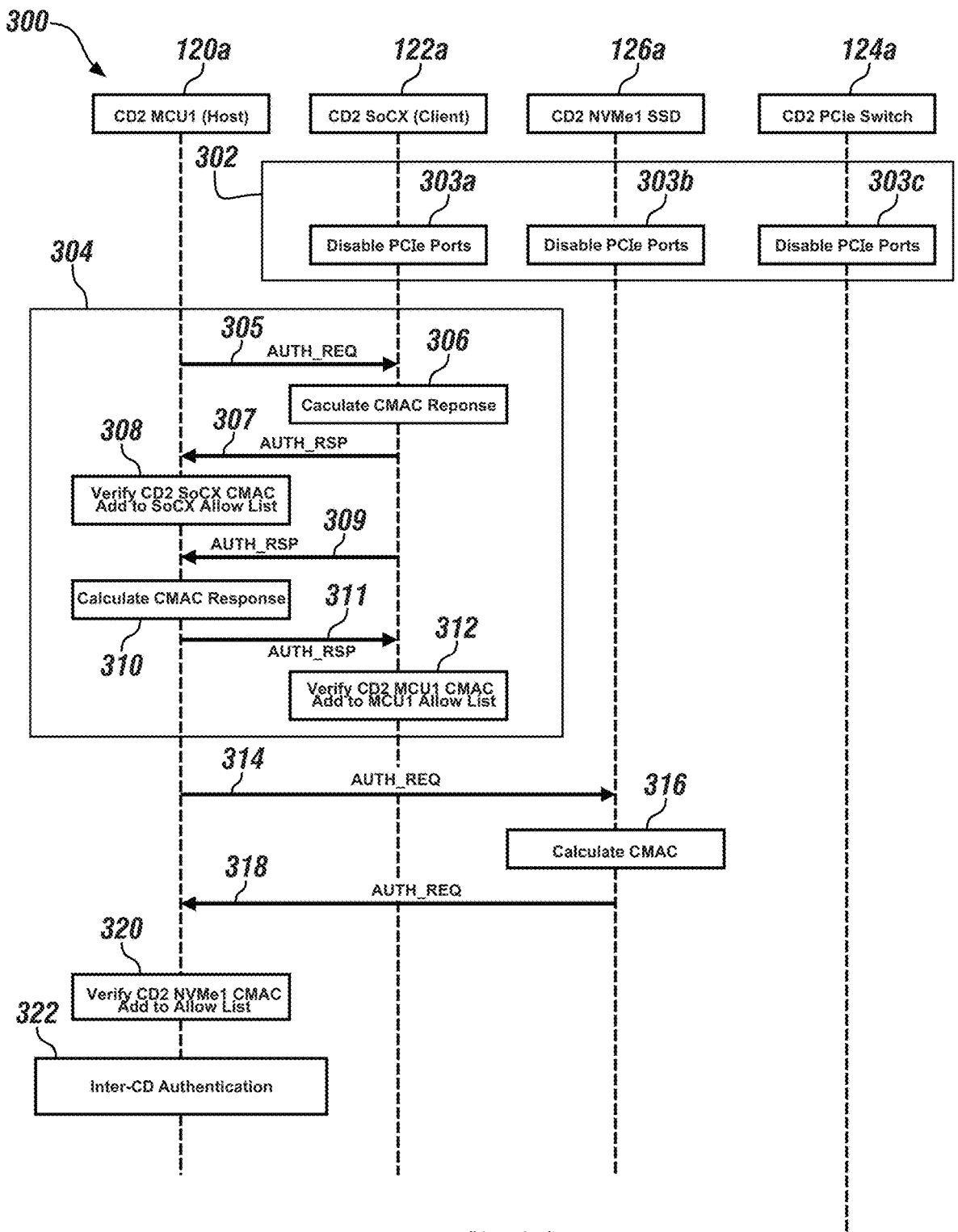
FIG. 10 is a flow diagram of a method for authentication within another compute device in accordance with one or more exemplary embodiments.

Referring to FIG. 10, a flow diagram of an example method 300 for authentication within the second compute device 110b is shown in accordance with one or more exemplary embodiments. The method (or process) 300 includes steps 302 to 322, as illustrated. The sequence of steps is shown as a representative example. Other step orders may be implemented to meet the criteria of a particular application.

In the step 302, the second processing circuits 122b, the second switch circuit 124b, and the second memory circuit 126b may disable or restrict ports 303a-303c to the second backplane bus 130b. The second microcontroller unit circuit 120b and the second processing circuits 122b may authenticate each other in the step 304 with a mutual attestation. The mutual attestations involve the second microcontroller unit circuit 120b sending an authorization request message (e.g., a challenge message 157, FIG. 4) to each second processing circuit 122b in the step 305. The authorization request messages may be sent sequentially to one second processing circuit 122b at a time, or broadcast to the second processing circuits 122b contemporaneously. Each second processing circuit 122b calculates a CMAC response in the step 306. The CMAC responses are returned to the second microcontroller unit circuit 120b in the step 307. The second microcontroller unit circuit 120b uses the internally generated challenge code and the received response values to authenticate/verify the individual second processing circuits 122b in the step 308. If the verifications pass/fail, the second microcontroller unit circuit 120b adds the second processing circuits 122b to the second allow list/second deny list as part of the step 308.

In the step 309, the second processing circuits 122b each send an authorization request message to the second microcontroller unit circuit 120b. The second microcontroller unit circuit 120b calculates CMAC responses in the step 310 and sends the responses to the second processing circuits 122b in the step 311. The second processing circuits 122b authenticate/verify the CMAC responses in the step 312. If the verifications pass/fail, the first processing circuits 122a add the first microcontroller unit circuit 120a to the second allow list/second deny list as part of the step 252. In the step 314, the second microcontroller unit circuit 120b sends an authorization request message to the second memory circuit 126b (e.g., a second memory attestation). The second memory circuit 126b calculates a CMAC response in the step 316. An authorization response message is sent by the second memory circuit 126b back to the second microcontroller unit circuit 120b in the step 318. The second microcontroller unit circuit 120b authenticates/verifies the second memory circuit 126b in the step 320 and adds the second memory circuit 124b to the second allow list or the second deny list based on the verification. In the step 322, the second microcontroller unit circuit 120b may perform the inter-compute device authentication to link with the first microcontroller unit circuit 120a (see FIG. 12).

Figure 11:
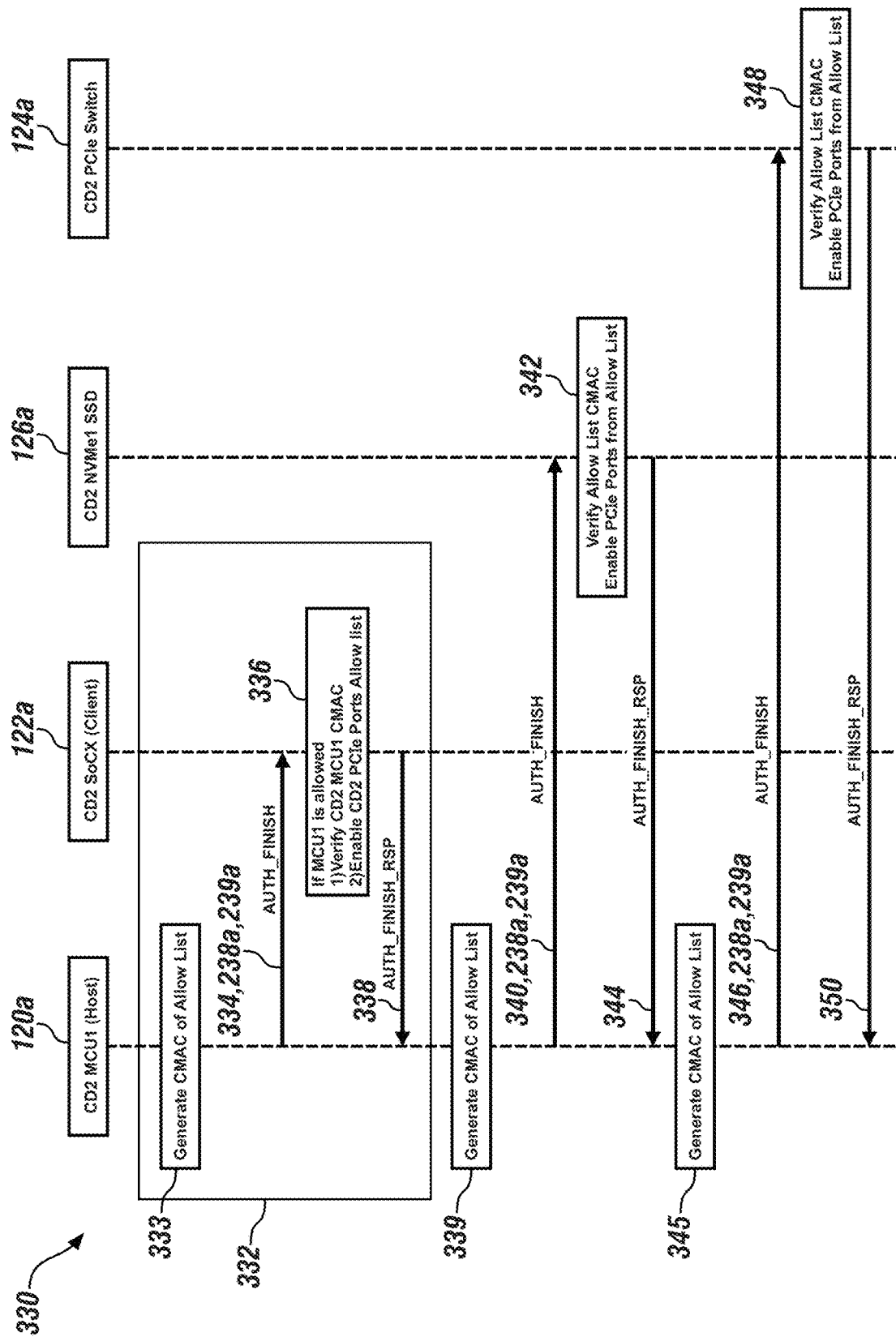
FIG. 11 is a flow diagram of a method for finishing authentication within the other compute device in accordance with one or more exemplary embodiments.

Referring to FIG. 11, a flow diagram of an example method 330 for finishing authentication within the second compute device 110b is shown in accordance with one or more exemplary embodiments. The method (or process) 330 includes steps 332 to 350, as illustrated. The sequence of steps is shown as a representative example. Other step orders may be implemented to meet the criteria of a particular application.

In the step 332, the second microcontroller unit circuit 120b generates a CMAC of the allow/deny lists relative to the second processing circuits b in the step 333, and notifies the second processing circuits 122b that the authentication has ended. The second microcontroller unit circuit 120b sends an authorization finished message with a second allow list 238b and a second deny list 239b to each second processing circuit 122b in the step 334. The authorization finished messages may be sent sequentially to one second processing circuit 122b at a time, or broadcast to the second processing circuits 122b contemporaneously. If the second microcontroller unit circuit 120b was previously allowed, each second processing circuit 122b verifies the second allow list 238b in the step 336 and enables the second backplane bus ports identified in the second allow list 238b for secure communications. The second processing circuits 122b send respective authentication finished responses back to the second microcontroller unit circuit 120b in the step 338.

The second microcontroller unit circuit 120b generates a CMAC of the allow/deny lists relative to the second memory circuit 126b in the step 339. In the step 340, the second microcontroller unit circuit 120b sends the authorization finished message with the second allow list 238b and a second deny list 239b to the second memory circuit 126b. The second memory circuit 126b verifies the second allow list 238b based on the CMAC in the step 342 and enables the second backplane bus ports identified in the second allow a list 238b. The second memory circuit 126b sends an authentication finished response back to the second microcontroller unit circuit 120b in the step 344.

The second microcontroller unit circuit 120b generates a CMAC of the allow/deny lists relative to the second switch circuit 124b in the step 345. In the step 346, the second microcontroller unit circuit 120b sends the authorization finished message with the second allow list 238b and a second deny list 239b to the second switch circuit 124b. The second switch circuit 124b verifies the second allow list 238b in the step 348 and enables the second backplane bus ports identified in the second allow list 238b. The second switch circuit 124b sends an authentication finished response back to the second microcontroller unit circuit 120b in the step 350.

Figure 12:
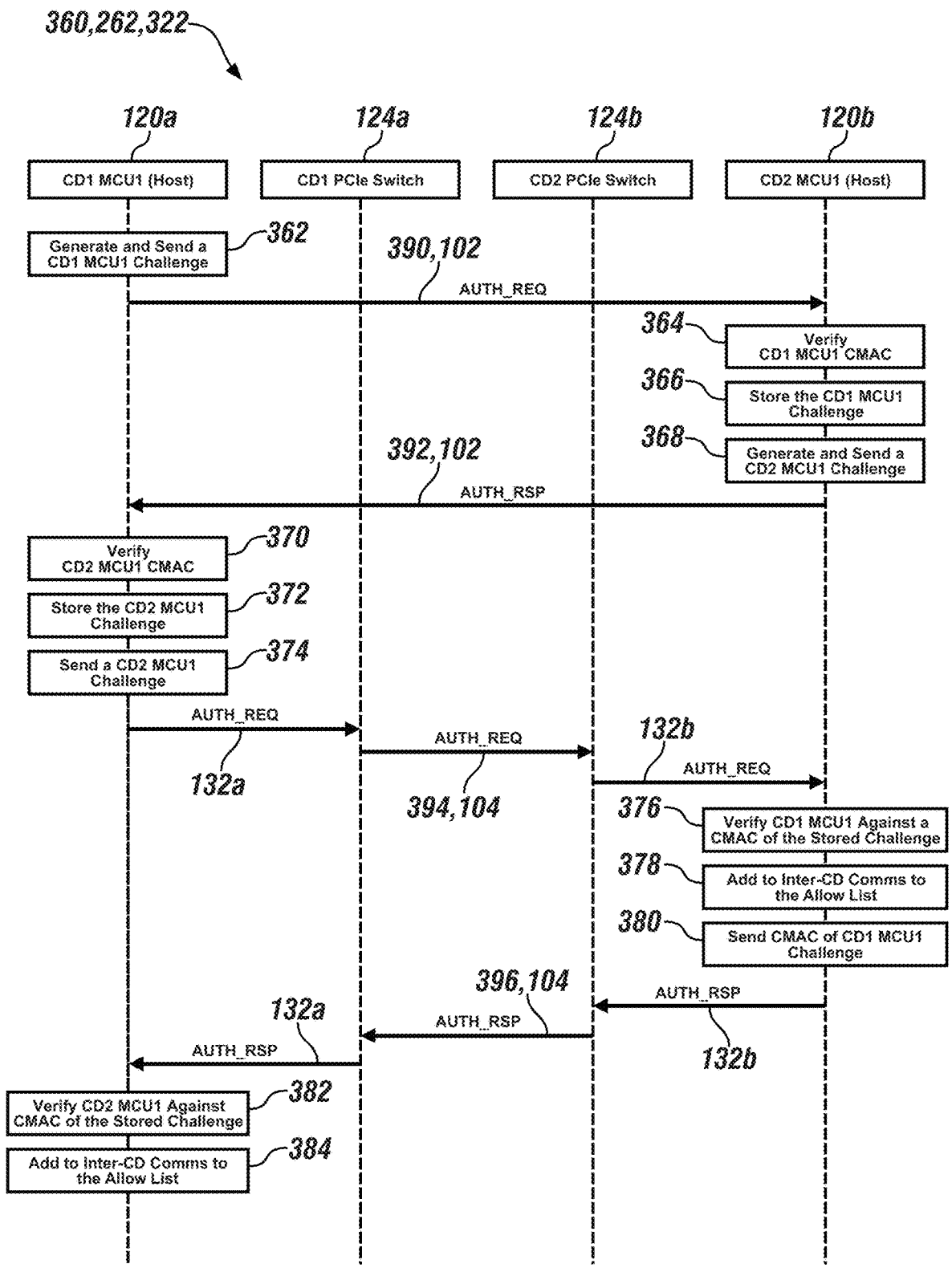
FIG. 12 is a flow diagram of a method for inter-compute device authentication in accordance with one or more exemplary embodiments.

Referring to FIG. 12, a flow diagram of an example method 360 for inter-compute device authentication is shown in accordance with one or more exemplary embodiments. The method 360 is an expansion of the step 262 in FIG. 8 and an expansion of the step 322 in FIG. 10. The method (or process) 360 includes steps 362 to 384, as illustrated. The sequence of steps is shown as a representative example. Other step orders may be implemented to meet the criteria of a particular application.

In the step 362, the first microcontroller unit circuit 120a may generate and sends a first challenge message 390 via the local area network bus 102 to the second microcontroller unit circuit 120b (e.g., a first inter-compute device attestation). The second microcontroller unit circuit 120b verifies a first CMAC value for the first challenge message 390 in the step 364. The first challenge message 390 is stored by the second microcontroller unit circuit 120b in the step 366 for later use.

In the step 368, the second microcontroller unit circuit 120b generates and sends a second challenge message 392 via the local area network bus 102 to the first microcontroller unit circuit 120a (e.g., a second inter-compute device attestation). The first microcontroller unit circuit 120a verifies a second CMAC value for the second challenge message 392 in the step 370. The second challenge message 392 is stored by the first microcontroller unit circuit 120a in the step 372 for later use.

In the step 374, the first microcontroller unit circuit 120a generates and sends a third CMAC value 394 for the locally stored (in step 372) second challenge message 392 via the first serial management bus 132a, the first switch circuit 124a, the physical communication link 104, the second switch circuit 124b, and the second serial management bus 132b to the second microcontroller unit circuit 120b. The second microcontroller unit circuit 120b verifies the third CMAC value 394 against a fourth CMAC value 396 for the locally stored (step 366) first challenge message 390 in the step 376. If the third CMAC value 394 matches the fourth CMAC value 396, the second microcontroller unit circuit 120b adds the inter-compute device communication to the second allow list in the step 378. The second switch circuit 124b responds to the second allow list by enabling communications in and out of the second compute device 110b on the physical communication link 104. Otherwise, the inter-compute device communication (if already present) is removed from the second allow list and is added to a second deny list. The second switch circuit 124b responds to the second deny list by blocking communications in and out of the second compute device 110b on the physical communication link 104.

In the step 380, the second microcontroller unit circuit 120b sends the fourth CMAC value 396 for the locally stored first challenge message 390 via the second serial management bus 132b, the second switch circuit 124b, the physical communication link 104, the first switch circuit 124a, and the first serial management bus 132a to the first microcontroller unit circuit 120a. The first microcontroller unit circuit 120a verifies the fourth CMAC value 396 against a fifth CMAC value of the locally stored (step 372) second challenge message 392 in the step 382. If the fourth CMAC value 396 matches the fifth CMAC value, the first microcontroller unit circuit 120a adds the inter-compute device communication to the first allow list in the step 384. The first switch circuit 124a responds to the first allow list by enabling communications in and out of the first compute device 110a on the physical communication link 104. Otherwise, the inter-compute device communication (if already present) is removed from the first allow list and is added to a first deny list. The first switch circuit 124a responds to the first deny list by blocking communications in and out of the first compute device 110a on the physical communication link 104.

Embodiments of the disclosure generally provide symmetric key attestation over SecOC technique where SecOC keys and message authentication methods are used to authenticate user-removable devices. The authentication may be performed over a local area network bus, such as Ethernet. The symmetric key attestation over SecOC technique may register newly installed devices using a back-office connection (e.g., the service tool/over-the-air port 112, FIG. 2). Electronic control unit identification values or similar identifiers are used to identify the new devices. The SecOC keys may be updated using the Secure Hardware Extension key update protocol.

In various embodiments of the symmetric key attestation over SecOC technique, an abstraction layer provides an interface between SecOC compliant devices and SecOC noncompliant devices. The electronic control unit identification value and an UNLOCK_ECU_KEY value may be securely programmed in a SecOC noncompliant device. Key encryption keys and authentication keys are derived from the electronic control unit identification value and the UNLOCK_ECU_KEY value. In some embodiments of the symmetric key attestation, a final attestation key may be wrapped using the derived key encryption key and framed with the electronic control unit identification value, a not-before ID value (NBID), and a message authentication code. The message authentication code is calculated using the derived authentication key.

The symmetric key attestation over SecOC technique generally implements unique keys in each direction to prevent playback attacks. Additional key slots may be allocated to remember previously installed-then-removed devices. Keys for the previously installed devices are cleared based on an amount of time elapsed from when the removed devices were last seen.

Links through the backplane buses are initialized as disabled or restricted. Therefore, the attestation over SecOC technique is performed using an out-of-band channel, such as Ethernet, I²C, SPI, or UART. In various embodiments, a centralized job scheduler is included in each compute device. Each centralized job schedule builds out an allow list using mutual attestation. In other embodiments, distributed job schedulers are included in each compute device. The distributed job schedules in each compute device builds out a local allow list.

In the symmetric key attestation over SecOC technique, a device measurement may include measurement values from a backplane bus configuration space of the device. The symmetric key attestation procedure may also authenticate an inter-compute device link (e.g., the physical communication link 104, FIG. 2). The symmetric key attestation procedure may isolate unauthenticated devices by distributing the allow list to authenticated devices that respond by opening PCIe links solely to authenticated devices.

In some embodiments, the symmetric key attestation may use regionalized keys to distinguish among different local regions. Back-office device registration and attestation job scheduler are included where duplicate electronic control unit identification values are added to a deny list. The electronic control unit identification values on the deny list are removed from the allow list. In various embodiments of the symmetric key attestation, challenge messages and response messages are periodically broadcast between devices.

The apparatus, methods, and systems of the disclosure provide techniques to prevent unauthorized devices installed within the vehicle electronics from communicating with authorized devices. The techniques provide for symmetric key attestation of removeable devices by authenticating, with a microcontroller unit circuit, multiple processing circuits with multiple processor attestations. The processing circuits reply to the processor attestations, and verify/authenticate the microcontroller unit circuit. Secure communications are enabled on a backplane bus among the processing circuits based on the authentications of the processing circuits and the verification of the microcontroller unit circuit.

Numerical values of parameters (e.g., of quantities or conditions) in this specification, including the appended claims, are to be understood as being modified in instances by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of values and further divided ranges within the entire range. Each value within a range and the endpoints of a range are hereby disclosed as a separate embodiment.

While the best modes for carrying out the disclosure have been described in detail, those familiar with the art to which this disclosure relates will recognize various alternative designs and embodiments for practicing the disclosure within the scope of the appended claims.

What is claimed is:

1. An apparatus comprising:
  a first compute device removably coupled to a local area network bus, and including a first microcontroller unit circuit, a plurality of first processing circuits, and a first backplane bus, wherein:
  initial unsecured communications through the first backplane bus is restricted;
  the first microcontroller unit circuit is permanently connected to the first compute device, and is operational to:
    authenticate the plurality of first processing circuits with a plurality of first processor attestations over the local area network bus based on a secure onboard communication protocol of an automotive open system architecture, a symmetric key, and a first message authentication code;
    allocate additional key slots to remember one or more previously installed circuits in the first compute device; and
    clear one or more keys for the one or more previously installed circuits based on a time lapse since last installed in the first compute device;
  the plurality of first processing circuits is removably coupled to the first compute device, and is operational to:
    reply to a respective one of the plurality of first processor attestations over the local area network bus; and verify the first microcontroller unit circuit based on the secure onboard communication protocol, the symmetric key, and the first message authentication code received from the first microcontroller unit circuit; and secure communications through the first backplane bus among the plurality of first processing circuits is enabled based on the authentications of the plurality of first processing circuits and the verifications of the first microcontroller unit circuit.

2. The apparatus according to claim 1, wherein:
the first compute device is removably coupled to a physical communication link, and further includes a first switch circuit and a first serial management bus;
the first microcontroller unit circuit is further operational to:
 communicate with the first switch circuit over the first serial management bus; and
 generate a first allow list based on the authentications of the plurality of first processing circuits; and
the first switch circuit is permanently coupled to the first compute device, and is operational to:
 translate data between the first backplane bus and the physical communication link; and
 enable the secure communications to the first backplane bus based on the first allow list.

3. The apparatus according to claim 1, wherein:
the first compute device further includes a first memory circuit and a first memory management bus;
the first microcontroller unit circuit is further operational to:
 authenticate the first memory circuit with a first memory attestation over the first memory management bus based on the secure onboard communication protocol, the symmetric key, and the first message authentication code; and
 generate a first allow list based on the authentication of the first memory circuit and the authentications of the plurality of first processing circuits; and
the first memory circuit is removably coupled to the first compute device, and is operational to:
 reply to the first memory attestation over the first memory management bus; and
 enable the secure communications through the first backplane bus between the plurality of first processing circuits and the first memory circuit based on the first allow list.

4. The apparatus according to claim 1, wherein:
the first compute device further includes a first unauthenticated circuit;
the first microcontroller unit circuit is further operational to:
 attempt authentication of the first unauthenticated circuit based on the secure onboard communication protocol, the symmetric key, and the first message authentication code; and
 generate a first deny list to isolate the first unauthenticated circuit in response to a failure to authenticate the first unauthenticated circuit; and
the plurality of first processing circuits is further operational to:
 block communications on the first backplane bus to the first unauthenticated circuit based on the first deny list.

5. The apparatus according to claim 1, wherein:
the symmetric key is updated with a secure hardware extension key update protocol.

6. The apparatus according to claim 1, wherein:
the first compute device further includes a noncompliant circuit that is not compliant with the secure onboard communication protocol; and
an electronic control unit identification value and an unlock-electronic-control-unit-key are programmed into the noncompliant circuit for use during an authentication.

7. The apparatus according to claim 1, wherein:
the local area network bus is one or more of an Ethernet bus, an inter-integrated circuit bus, a serial peripheral interface bus, and a universal asynchronous receiver-transmitter bus;
the first backplane bus is a peripheral component interconnect express bus; and
the first microcontroller unit circuit is further operational to authenticate the plurality of first processing circuits based on one or more of (i) a power on condition, (ii) a detection that one or more of the plurality of first processing circuits is newly installed in the first compute device, and (iii) periodically.

8. The apparatus according to claim 1, further comprising:
a second compute device coupled to the local area network bus, and including a second microcontroller unit circuit, a plurality of second processing circuits, and a second backplane bus, wherein
initial unsecured communications through the second backplane bus is restricted;
the second microcontroller unit circuit is permanently connected to the second compute device, and is operational to:
 authenticate the plurality of second processing circuits with a plurality of second processor attestations over the local area network bus based on the secure onboard communication protocol, the symmetric key, and a second message authentication code; and
 generate a second allow list based on the authentications of the plurality of second processing circuits;
the plurality of second processing circuits is removably coupled to the second microcontroller unit circuit, and is operational to:
 reply to a respective one of the plurality of second processor attestations over the local area network bus; and
 verify the second microcontroller unit circuit based on the secure onboard communication protocol, the symmetric key, and the second message authentication code received from the second microcontroller unit circuit; and
secure communications through the second backplane bus among the plurality of second processing circuits is enabled based on the authentications of the plurality of second processing circuits and the verifications of the second microcontroller unit circuit.

9. A method for symmetric key attestation of removeable circuits comprising:
restricting initial unsecured communications through a first backplane bus of a first compute device, wherein:
 the first compute device is removably coupled to a local area network bus, and includes a first microcontroller unit circuit, a plurality of first processing circuits, and the first backplane bus;
 the first microcontroller unit circuit is permanently connected to the first compute device; and
 the plurality of first processing circuits are removably coupled to the first compute device;

authenticating, with the first microcontroller unit circuit, the plurality of first processing circuits with a plurality of first processor attestations over the local area network bus based on a secure onboard communication protocol of an automotive open system architecture, a symmetric key, and a first message authentication code;
allocating, in the first microcontroller unit circuit, additional key slots to remember one or more previously installed circuits in the first compute device;
clearing one or more keys for the one or more previously installed circuits based on a time lapse since last installed in the first compute device;
replying, with the plurality of first processing circuits, to a respective ones of the plurality of first processor attestations over the local area network bus;
verifying, with the plurality of first processing circuits, the first microcontroller unit circuit based on the secure onboard communication protocol, the symmetric key, and the first message authentication code received from the first microcontroller unit circuit; and
enabling secure communications on the first backplane bus among the plurality of first processing circuits based on the authenticating of the plurality of first processing circuits and the verifying of the first microcontroller unit circuit.

10. The method according to claim 9, further comprising:
communicating with a first switch circuit of the first compute device using the first microcontroller unit circuit;
generating a first allow list based on the authenticating of the plurality of first processing circuits;
translating data between the first backplane bus and a physical communication link, wherein the first compute device is removably coupled to the physical communication link; and
enabling the secure communications between the first switch circuit and the first backplane bus based on the first allow list.

11. The method according to claim 9, further comprising:
authenticating, with the first microcontroller unit circuit, a first memory circuit of the first compute device with a first memory attestation over a first memory management bus of the first compute device based on the secure onboard communication protocol, the symmetric key, and the first message authentication code, wherein the first memory circuit is removably coupled to the first compute device;
replying, with the first memory circuit, to the first memory attestation over the first memory management bus;
generating a first allow list based on the authentication of the first memory circuit and the authentications of the plurality of first processing circuits; and
enabling communication on the first backplane bus between the plurality of first processing circuits and the first memory circuit based on the first allow list.

12. The method according to claim 9, further comprising:
attempting, with the first microcontroller unit circuit, to authenticate a first unauthenticated circuit of the first compute device based on the secure onboard communication protocol, the symmetric key, and the first message authentication code;
generating, with the first microcontroller unit circuit, a first deny list to isolate the first unauthenticated circuit in response to a failure to authenticate the first unauthenticated circuit; and
blocking, with the plurality of first processing circuits, communications on the first backplane bus to the first unauthenticated circuit based on the first deny list.

13. The method according to claim 9, further comprising:
updating the symmetric key with a secure hardware extension key update protocol, wherein the symmetric key is regionalized to accommodate a plurality of local regions.

14. The method according to claim 9, wherein:
the first compute device further includes a noncompliant circuit that is not compliant with the secure onboard communication protocol; and
an electronic control unit identification value and an unlock-electronic-control-unit-key are programmed into the noncompliant circuit for use during an authentication.

15. A system comprising:
a first compute device coupled to a local area network bus, and including a first microcontroller unit circuit, a plurality of first processing circuits, and a first backplane bus; and
a second compute device coupled to the local area network bus, and including a second microcontroller unit circuit, a plurality of second processing circuits, and a second backplane bus, wherein:
the first microcontroller unit circuit is operational to:
authenticate the plurality of first processing circuits with a plurality of first processor attestations over the local area network bus based on a secure onboard communication protocol of an automotive open system architecture, a symmetric key, and a first message authentication code;
allocate additional key slots to remember one or more previously installed circuits in the first compute device; and
clear one or more keys for the one or more previously installed circuits based on a time lapse since last installed in the first compute device;
the plurality of first processing circuits is operational to reply to a respective one of the plurality of first processor attestations over the local area network bus;
secure communications through the first backplane bus among the plurality of first processing circuits is enabled based on the authentications of the plurality of first processing circuits and the authentications of the first microcontroller unit circuit;
the second microcontroller unit circuit is operational to authenticate the plurality of second processing circuits with a plurality of second processor attestations over the local area network bus based on the secure onboard communication protocol, the symmetric key, and a second message authentication code;
the plurality of second processing circuits is operational to reply to respective ones of the plurality of second processor attestations over the local area network bus; and
secure communications through the second backplane bus among the plurality of second processing circuits is enabled based on the authentications of the plurality of second processing circuits and the authentications of the second microcontroller unit circuit.

16. The system according to claim 15, wherein:
the first compute device is coupled to a physical communication link, and further includes a first switch circuit and a first serial management bus;

the first microcontroller unit circuit is further operational to:
    communicate with the first switch circuit over the first serial management bus; and
    generate a first allow list based on the authentications of the plurality of first processing circuits; and
the first switch circuit is operational to:
    translate data between the first backplane bus and the physical communication link; and
    enable the secure communications to the first backplane bus based on the first allow list.

17. The system according to claim 16, wherein:
the first compute device is further operational to authenticate the second compute device with a first inter-compute device attestation over the physical communication link;
the second compute device is further operational to authenticate the first compute device with a second inter-compute device attestation over the physical communication link; and
the first switch circuit is enabled to communicate with the second switch circuit over the physical communication link based on the authentication of the first compute device and the authentication of the second compute device.

18. The system according to claim 16, further comprising:
a vehicle that houses the first compute device and the second compute device.

19. The system according to claim 16, wherein:
the second compute device is coupled to the physical communication link, and further includes a second switch circuit and a second serial management bus;
the second microcontroller unit circuit is further operational to:
    communicate with the second switch circuit over the second serial management bus; and
    generate a second allow list based on the authentications of the plurality of second processing circuits; and
the second switch circuit is operational to:
    translate data between the second backplane bus and the physical communication link; and
    enable the secure communications to the second backplane bus based on the second allow list.

20. The system according to claim 15, wherein:
the first compute device further includes a first memory circuit and a first memory management bus;
the first microcontroller unit circuit is further operational to:
    authenticate the first memory circuit with a first memory attestation over the first memory management bus based on the secure onboard communication protocol, the symmetric key, and the first message authentication code; and
    generate a first allow list based on the authentication of the first memory circuit and the authentications of the plurality of first processing circuits; and
the first memory circuit is removably coupled to the first compute device, and is operational to:
    reply to the first memory attestation over the first memory management bus; and
    enable the secure communications through the first backplane bus between the plurality of first processing circuits and the first memory circuit based on the first allow list.

* * * * *